J. C. McLaughlin,

Boiler Cleaner.

No. 104,178. Patented June 14, 1870.

Witnesses:

Inventor:
J. C. McLaughlin
Per
Attorneys.

United States Patent Office.

JOHN C. McLAUGHLIN, OF PITTSBURG, PENNSYLVANIA.

Letters Patent No. 104,178, dated June 14, 1870.

STEAM-BOILER BLOW-OFF PIPE.

The Schedule referred to in these Letters Patent and making part of the same.

*To all whom it may concern:*

Be it known that I, JOHN C. MCLAUGHLIN, of Pittsburg, in the county of Allegheny and State of Pennsylvania, have invented a new and useful Improvement in Steam-boiler Blow-off Pipe; and I do hereby declare that the following is a full, clear, and exact description thereof, which will enable others skilled in the art to make and use the same, reference being had to the accompanying drawing forming part of this specification.

The object of this invention is to provide efficient means for clearing the bottoms or interior lower surface of steam-boilers of scale and sediment, thereby preventing such boilers from being damaged by the fire; and It consists in a blow-off pipe, supported in the boiler, in any suitable manner, a short distance above bottom, or above the fire-furnace of the boiler, with an open end curved toward the bottom, and with one or more branch-pipes attached thereto, and discharging through the mud-box, as hereinafter more fully described.

In the accompanying drawing—

Similar letters of reference indicate corresponding parts.

Figure 1:
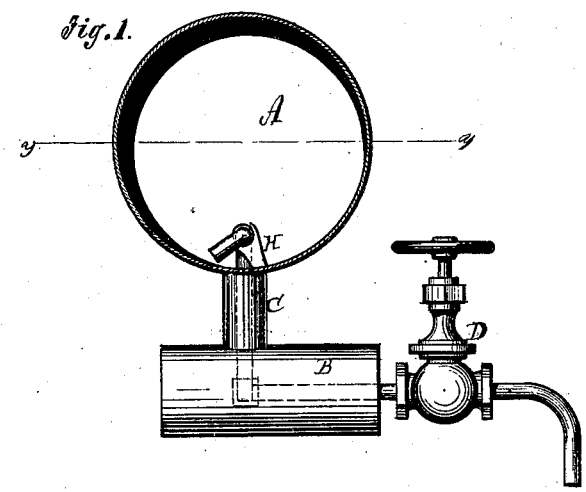
Figure 1 represents a vertical cross-section of fig. 2, on the line *x x*.
Figure 2:
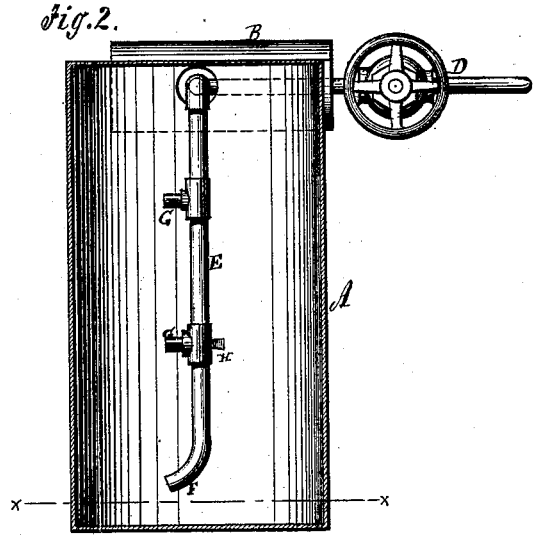
Figure 2 is a longitudinal horizontal section of fig. 1, on the line *y y*.

A is the boiler.

B is the mud-box, attached to the back end of the boiler by the vertical pipe C.

D is the blow-off cock.

E is the interior blow-off pipe, which passes from the boiler down into and through the mud-box to the cock D, as seen in the drawing.

F is the curved open end.

G G represent branches pointing downward.

H is a support, which raises the pipe above the bottom, as seen in fig. 1.

The principal danger of burning or overheating a steam-boiler consists in the formation of scale directly over the fire or on the bottom of the boiler. By the arrangement of the blow-off pipe as represented, the scale is started from the bottom, and blown out through the pipe when the blow-off cock is opened.

Being a practical engineer of large experience on western rivers, where sediment is deposited and formed into scale to a greater extent than at the east, I have tried various means, with a view of finding a remedy, as the scale on the bottom is the cause of more damage and destruction to boilers than all other causes combined.

My blow-off pipe is made large, so that a strong current is suddenly started. By thus suddenly removing the pressure from the scale directly over the hottest portion of the boiler, where the scale forms in greatest quantity, the heat and the relief from pressure cause the scale to start or become loosened from the iron at once, thus preventing the possibility of damage being caused thereby, if the boiler is blown off at suitable intervals.

I do not claim, broadly, a blow-off pipe inside a steam-boiler, as I am aware that such pipes have been used before, but none that I have seen have been properly arranged, and they have, consequently, failed of producing the desired effect, that is, loosening the scale directly over the fire.

Having thus described my invention,

I claim as new and desire to secure by Letters Patent—

In combination with a steam-boiler, the blow-off pipe E, when the same is constructed and arrranged therein substantially as shown and described, and for the purposes set forth.

JOHN C. McLAUGHLIN.

Witnesses:
 E. P. BLACK,
 ISAAC BLACK,
 AND. HUMBERT.